United States Patent Office 3,413,246
Patented Nov. 26, 1968

3,413,246
PRESSURE-SENSITIVE ADHESIVE COMPOSITIONS BASED ON CYCLIC TERPENE-STYRENE COPOLYMERS
Henry P. Weymann and Yun Jen, Pensacola, Fla., assignors to Tenneco Chemicals, Inc., a corporation of Delaware
No Drawing. Filed Aug. 26, 1965, Ser. No. 482,922
17 Claims. (Cl. 260—4)

ABSTRACT OF THE DISCLOSURE

Pressure-sensitive adhesive compositions that have an excellent combination of tackiness, cohesive strength, adhesive strength, and other valuable properties comprise a rubbery elastomer and a terpene copolymer. Particularly advantageous results have been obtained using compositions that contain styrene-butadiene rubber and/or natural rubber as the elastomer and a dipentene-styrene copolymer as the tackifier.

---

This invention relates to adhesive compositions. More particularly it relates to normally tacky, pressure-sensitive adhesive compositions suitable for coating flexible and elastic backing materials to form pressure-sensitive adhesive tapes.

Pressure-sensitive adhesive compositions which are useful as adhesive coatings on tapes, strips, and sheets of paper, fabric, cellulose acetate, polyvinyl chloride, and other backing materials generally comprise a polymeric cohesive agent in combination with a compatible, thermoplastic resinous material which serves as the adhesion- and tack-imparting component.

For a composition to be useful as a pressure-sensitive adhesive it must have a proper balance between its adhesive strength, its cohesive strength, and its tackiness. Many materials have been recommended for use as tackifiers in pressure-sensitive adhesive compositions, but none has proven to be entirely satisfactory in imparting the required adhesion and tackiness to the cohesive agents that are ordinarily used in these compositions. Some of the materials which alone appear to be suitable as tackifier materials are unsatisfactory for use in these compositions because they adversely affect the cohesion of the adhesive, they impart color to it, or they lower its resistance to oxidation, to heat, and to acids and alkalies. Others are incompatible with the synthetic rubbers that are used as the cohesive agent and do not impart the necessary tackiness to compositions containing synthetic rubber alone or in combination with natural rubber.

In accordance with this invention, it has been discovered that when certain terpene copolymers are employed as the tackifier in combination with polymeric cohesive agents, the resulting pressure-sensitive adhesive compositions exhibit a highly satisfactory balance of tackiness, cohesive strength, adhesive strength, and other properties.

The terpene copolymers that have been found to be valuable as tackifiers for pressure-sensitive adhesive compositions are the thermoplastic resinous products obtained by polymerizing a mixture of monomers comprising a cyclic monoterpene hydrocarbon component and styrene or a substituted styrene. The cyclic monoterpene hydrocarbon component may consist of a single cyclic monoterpene hydrocarbon, such as dipentene, limonene, α-pinene, β-pinene, a carene, or a phellandrene; a mixture of cyclic monoterpene hydrocarbons; or a mixture of one or more cyclic monoterpene hydrocarbons with an acyclic terpene, such as allo-ocimene, and/or with terpene oligomers. The useful comonomers include styrene, alkylstyrenes having fewer than 13 carbon atoms, alkenylstyrenes having fewer than 13 carbon atoms, chlorostyrenes, and mixtures thereof. Illustrative of these substituted styrenes are α-methylstyrene, α-butylstyrene, α,2-dimethylstyrene, ethylstyrene, divinylstyrene, α-chlorostyrene, 3-chlorostyrene, and the like.

A preferred group of terpene copolymers for use as tackifiers for adhesive compositions are those prepared from dipentene or β-pinene and styrene. Another preferred group of terpene copolymers includes those prepared by polymerizing a mixture of comonomers comprising (a) α-pinene, turpentine, or a mixture of terpenes which is obtained by the pyrolysis of turpentine and which contains approximately 40 to 60 percent of dipentene, 25 to 40 percent of allo-ocimene, and 15 to 25 percent of terpene oligomers and (b) divinylbenzene. The mixture of monomers may also contain styrene or an alkylstyrene.

These terpene copolymers, which have softening points in the range of approximately 15° C. to 150° C., are soluble in a wide variety of aliphatic, cycloaliphatic, and aromatic hydrocarbon solvents and are compatible with natural rubber and with the synthetic rubbers that are ordinarily used in the preparation of adhesive compositions.

The terpene copolymers may be prepared by any suitable and convenient procedure. For example, a mixture of the comonomers can be polymerized in the presence of an acid polymerization catalyst, such as aluminum chloride or boron trifluoride, at a temperature in the range of approximately 60° C. to 150° C. to form resinous products having the desired properties. In most cases approximately 0.2 part to 20 parts by weight of a terpene or a mixture of terpenes is used per part by weight of the styrene component, according to the physical and adhesive properties desired. Copolymers of particular value as tackifiers for pressure-sensitive adhesive compositions that contain styrene-butadiene elastomers result when approximately equal weights of the comonomers are used.

The cohesive agent that is used in the pressure-sensitive adhesive compositions of this invention may be natural rubber, a synthetic elastomer, or a mixture of these elastomers. Among the useful synthetic elastomers are polymerized isomonoolefins, such as polyisobutylene rubber; polymerized dienes and substituted dienes, such as polybutadiene rubber, polyisoprene rubber, polymethylisoprene rubber, polymethylpentadiene rubber; polymers of vinyl substituted compounds, such as polyvinyl ethers and polyacrylates; binary and higher copolymers such as styrene-butadiene (SBR), butadiene-acrylonitrile, styrene-butadiene-acrylonitrile, ethylene-propylene-ethylene dimethacrylate rubbers; and mixtures thereof. The invention is of particular value in the preparation of pressure-sensitive adhesive compositions containing styrene-butadiene rubber alone or in combination with natural rubber inasmuch as no tackifier has previously been known which will impart desired combination of tackiness, adhesion, and other properties of these elastomers.

The amount of the terpene copolymer that is incorporated in the adhesive coposition is largely dependent upon the choice of copolymer and rubber elastomer and upon the properties desired in the adhesive composition. Approximately 20 parts to 200 parts by weight of the terpene copolymer is generally used per 100 parts by weight of the elastomer, with particularly satisfactory results being obtained when 50 parts to 125 parts by weight of the copolymer is used per 100 parts by weight of the elastomer. Since the terpene copolymer is ordinarily less expensive than the elastomer, there is a financial advantage in using as much copolymer as possible. The upper limit of the copolymer to elastomer ratio is often determined by the physical state of the mixture; many copolymers will at concentrations above those giving maximum adhesives properties impart resinous rather than rubbery characteristics to the blend.

The pressure-sensitive adhesive compositions of this invention may contain the terpene copolymer as their sole tackifier, or they may contain other tackifiers in combination therewith. Examples of other tackifiers that may be used in combination with the terpene copolymers are rosin, hydrogenated rosin, disproportionated rosin, esters of rosin and hydrogenated rosin, terpene homopolymers, petroleum hydrocarbon resins, and the like.

In addition to the elastomer and the terpene copolymer, the adhesive compositions may contain plasticizers, stabilizers, solvents, fillers, pigments, dyes, curing agents, and the like in the amounts ordinarily employed for these purposes.

Any of the methods ordinarily used for the preparation of products of this type can be used in the preparation of the adhesive composition of this invention. For example, the rubbery elastomer can be mixed with the tackifier and other ingredients, if any, and the resulting mixture dissolved in a hydrocarbon solvent, such as toluene, xylene, mineral spirits, or cyclohexane, or the blend can be prepared for use as a dry mix, as an aqueous dispersion, or as an emulsion. Tapes can be prepared from dispersions, emulsions, or solutions by spreading the liquid film on suitable backing materials, drying the now-layered product, optionally adding another layer, e.g., release paper, on top of the adhesive layer, and cutting the composition to the desired widths. Essentially the same finishing procedures can be used when the blend is applied dry as a melt at higher temperatures; in this case, no solvent or water removal is necessary.

The invention is further illustrated by the examples that follow. In these examples all parts and percentages are parts by weight and percentages by weight unless otherwise specified.

Example 1

A series of copolymers was prepared by the following procedure: To a mixture of 250 parts of toluene, 250 parts of petroleum naphtha (boiling range 110°–152° C.; KB value 34–36), and 25 parts of anhydrous aluminum chloride at 40° C. was added 500 parts of a monomer mixture containing a terpene component and styrene or a substituted styrene over a period of one hour. The mixture was stirred for one hour at 40° C. after the addition of the monomers had been completed. Then 25 parts of calcium hydroxide and 25 parts of decolorizing earth (Filtrol 20) were added, and the mixture was heated to 140° C. with removal of sufficient lower-boiling solvent to maintain reflux at that temperature. The mixture was heated at its reflux temperature for 16 hours and then filtered. The filtrate was steam-distilled at 220°–230° C. to remove the volatile materials from the resinous residue. The composition and properties of the copolymers are given in Table I.

TABLE I

| Ex. No. | Composition of monomer mixture (parts) | Copolymer | | |
|---|---|---|---|---|
| | | Percent yield | Ball and ring softening point (° C.) | Gardner color (50% solids in mineral spirits) |
| I-A | 250 dipentene, 250 styrene | 95.4 | 87 | 3–4 |
| I-B | 375 dipentene, 125 styrene | 93.6 | 110 | 1–2 |
| I-C | 125 dipentene, 375 styrene | 82.2 | 83 | 9 |
| I-D | 250 β-pinene, 250 styrene | 88.0 | 91 | 5–6 |
| I-E | 250Δ³-carene, 250 styrene | 70.2 | 73 | 8–9 |
| I-F | 250 dipentene, 250 α-methylstyrene | 76.6 | 63 | 2–3 |
| I-G | 450 dipentene, 50 divinylbenzene | 76.6 | 151 | 5 |
| I-H | 475 turpentine, 25 divinylbenzene | 74.8 | 113 | 2–3 |
| I-I | 475 mixture containing 50% dipentene, 30% allo-ocimene and 20% terpene oligomers; 25 divinylbenzene | 74.8 | 113 | 3 |
| I-J | 225 α-pinene, 225 styrene, 50 divinylbenzene | 75.0 | 98.5 | 2–3 |
| I-K | 225 α-pinene, 225 α-methylstyrene, 50 divinylbenzene | 50 | 82.5 | 2–3 |

Example 2

A copolymer was prepared by the following procedure: To a mixture of 250 parts of toluene, 250 parts of petroleum naphtha (boiling range 110°–152° C.; KB value 34–36), and 25 parts of boron trifluoride etherate at −10° C. was added a mixture of 250 parts of d-limonene and 250 parts of styrene over a period of three hours. The mixture was stirred at −10° C. for 30 minutes after the addition of the monomers had been completed. The reaction mixture was washed with four 500 part portions of water and then steam distilled at 220°–230° C. to separate the volatile materials from the resinous residue. There was obtained an 85.8% yield of a d-limonene-styrene copolymer that had a Ball and Ring Softening Point of 55° C. and a Gardner color (50% solids in mineral spirits) of 2.

Example 3

A series of pressure-sensitive adhesive tapes were prepared using the following elastomers: natural rubber (pale crepe, milled to a Mooney viscosity of 48.5, MS/4, 212° F.) polyisoprene (Natsyn 2200, milled slightly), and styrene-butadiene rubber (GRS 1502, milled slightly). The tackifier used was a dipentene-styrene copolymer which was prepared from equal weights of the monomers by the procedure described in Example 1 and which had a Ball and Ring Melting Point of 100° C. For comparative purposes, similar series of adhesive compositions were prepared that contained as tackifier either a terpene homopolymer that had a Ball and Ring Melting Point of 100° C. (Nirez 1100) or a styrene homopolymer that had a Ball and Ring Melting Point of 100° C. (Piccotex 100).

Each of the three tackifiers was mixed with each of the three elastomers at tackifier to rubber ratios of 25, 50, 75, 100, and 125 parts per 100 parts. The mixtures were dissolved in toluene to form solutions having viscosities of approximately 5000 centipoises. These solutions were applied to films of unprimed Mylar, one mil gage, at a wet thickness that yielded dry adhesive films of one ounce per square yard coating weight. Strips of pressure sensitive adhesive tapes which were cut from these coated films were evaluated by the following procedures: Hold Value (shear strength or the rate of cold flow of the adhesive under continuous stress).

A half-inch strip of tape was attached to a half-inch by half-inch bar to provide a contact area of one half-inch square. The bar was then positioned so that the adhered tape was 20° from the vertical with the adhered portion on the underside of the bar and the free end hanging down. A 400 gram weight was suspended from the free end of the tape. The time in minutes that the tape supported the weight is recorded as the "Hold." Adhesion Value (the force required to peel tape from a clean dry surface).

This procedure is described in detail in Federal Specification UU–P–31, Method 100. It measures the force, in ounces per inch width of tape, required to peel the tape from a polished stainless steel panel at a rate of twelve inches per minute with the tape doubled back on itself at an angle of 180°.

Tack Value: Tack was measured by determining the distance in inches that a 3.0 gram, ⅜-inch diameter steel ball rolled on a horizontal pressure-sensitive tape after being given momentum equivalent to a four-inch drop. To convert this measurement to one which increases in numerical value with increase in tack, it was divided into four (the number of inches dropped) and the quotient multiplied by 10.

In each case the styrene homopolymer was incompatible with the rubbery elastomer and imparted no tack to it.

The properties of the adhesive compositions containing a dipentene-styrene copolymer as tackifier and of comparative compositions containing a terpene homopolymer as tackifier are set forth in Tables II, III, and IV.

TABLE II.—PROPERTIES OF PRESSURE-SENSITIVE ADHESIVES CONTAINING STYRENE-BUTADIENE RUBBER AS THE ELASTOMER

| Tape No. | Tackifier | PHR* | Hold value | Adhesive value | Tack value |
|---|---|---|---|---|---|
| II-a | Dipentene-styrene copolymer | 25 | 0 | 2 | 6 |
| b |  | 50 | 0 | 12 | 6 |
| c |  | 75 | 0 | 28 | 4 |
| d |  | 100 | 0 | 42 | 2 |
| e |  | 125 | 0 | 53 | 0 |
| f | Terpene Homopolymer (Nirez 1100) | 25 | 0 | 40 | 0 |
| g |  | 50 | 0 | 32 | 0 |
| h |  | 75 | 0 | 3 | 0 |
| i |  | 100 | 0 | 4 | 0 |
| j |  | 125 | 0 | 1 | 0 |

*Parts of tackifier per 100 parts of elastomer.

TABLE III.—PROPERTIES OF PRESSURE SENSITIVE ADHESIVES CONTAINING NATURAL RUBBER AS THE ELASTOMER

| Tape No. | Tackifier | PHR* | Hold value | Adhesive value | Tack value |
|---|---|---|---|---|---|
| III-a | Dipentene-styrene copolymer | 25 | 0 | 1 | 9 |
| b |  | 50 | 50 | 6 | 33 |
| c |  | 75 | 1,000 | 19 | 17 |
| d |  | 100 | 1,000 | 32 | 10 |
| e |  | 125 | 2,100 | 47 | 0 |
| f | Terpene Homopolymer (Nirez 1100) | 25 | 0 | 0 | 19 |
| g |  | 50 | 0 | 6 | 22 |
| h |  | 75 | 100 | 17 | 31 |
| i |  | 100 | 510 | 29 | 17 |
| j |  | 125 | 650 | 45 | 0 |

*Parts of tackifier per 100 parts of elastomer.

TABLE IV.—PROPERTIES OF PRESSURE SENSITIVE ADHESIVES CONTAINING POLYISOPRENE AS THE ELASTOMER

| Tape No. | Tackifier | PHR* | Hold value | Adhesive value | Tack value |
|---|---|---|---|---|---|
| IV-a | Dipentene-styrene copolymer | 25 | 0 | 2 | 20 |
| b |  | 50 | 0 | 14 | 45 |
| c |  | 75 | 0 | 26 | 37 |
| d |  | 100 | 50 | 46 | 10 |
| e |  | 125 | 100 | 60 | 0 |
| f | Terpene Homopolymer (Nirez 1100) | 25 | 0 | 3 | 23 |
| g |  | 50 | 0 | 12 | 50 |
| h |  | 75 | 0 | 26 | 44 |
| i |  | 100 | 0 | 40 | 19 |
| j |  | 125 | 0 | 54 | 0 |

*Parts of tackifier per 100 parts of elastomer.

From the data in Tables II, III, and IV, it will be seen that the dipentene-styrene copolymer is an excellent tackifier for styrene-butadiene rubber as is shown by the increase in adhesion with increased resin concentration and by the development of tack. In polyisoprene and in natural rubber compositions, the dipentene-styrene copolymer was also more effective as a tackifier than the terpene homopolymer.

Each of the other terpene copolymers disclosed herein may also be used to impart tack and adhesion to pressure-sensitive adhesive compositions that contain a natural rubber or synthetic rubber as the polymeric cohesive agent.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A pressure-sensitive adhesive composition comprising a rubbery elastomer selected from the group consisting of natural rubber, styrene-butadiene rubber, polyisoprene, and mixtures thereof and 50 parts to 125 parts by weight per 100 parts by weight of said elastomer of a tackifier, said tackifier comprising a copolymer of a cyclic monoterpene hydrocarbon component and a comonomer selected from the group consisting of styrene alkylstyrenes having fewer than 13 carbon atoms, alkenylstyrenes having fewer than 13 carbon atoms, and mixtures thereof, said copolymer containing approximately 0.2 part to 20 parts by weight of units derived from said terpene per part by weight of units derived from said comonomer.

2. A pressure-sensitive adhesive composition according to claim 1 wherein the terpene component of the copolymer is dipentene.

3. A pressure-sensitive adhesive composition according to claim 1 wherein the terpene component of the copolymer is α-pinene.

4. A pressure-sensitive adhesive composition according to claim 1 wherein the terpene component of the copolymer is β-pinene.

5. A pressure-sensitive adhesive composition according to claim 1 wherein the comonomer is styrene.

6. A pressure-sensitive adhesive composition according to claim 1 wherein the rubbery elastomer comprises styrene-butadiene rubber.

7. A pressure-sensitive adhesive composition comprising a rubbery elastomer and 50 parts to 125 parts by weight per 100 parts by weight of said elastomer of a tackifier, said tackifier comprising a copolymer of a cyclic monoterpene hydrocarbon component and divinylbenzene, said copolymer containing approximately 0.2 part to 20 parts by weight of units derived from said terpene component per part by weight of units derived from divinylbenzene.

8. A pressure-sensitive adhesive composition according to claim 7 wherein the terpene component of the copolymer comprises dipentene.

9. A pressure-sensitive adhesive composition according to claim 7 wherein the terpene component of the copolymer comprises α-pinene.

10. A pressure-sensitive adhesive composition according to claim 7 wherein the terpene component of the copolymer is turpentine.

11. A pressure-sensitive adhesive composition according to claim 7 wherein the terpene component of the copolymer is a mixture of terpenes containing approximately 40 to 60 percent of dipentene, 25 to 40 percent of allo-ocimene, and 15 to 25 percent of terpene oligomers.

12. Pressure-sensitive adhesive tape comprising backing material and a tacky adhesive coating composition thereon, said coating composition comprising a rubbery elastomer selected from the group consisting of natural rubber, styrene-butadiene rubber, polyisoprene, and mixtures thereof and 20 parts to 200 parts by weight per 100 parts by weight of said elastomer of a tackifier, said tackifier comprising a copolymer of a cyclic monoterpene hydrocarbon component and a comonomer selected from the group consisting of styrene, alkylstyrenes having fewer than 13 carbon atoms, alkenylstyrenes having fewer than 13 carbon atoms, and mixtures thereof, said copolymer containing approximately 0.2 part to 20 parts by weight of said terpene component per part by weight of said comonomer.

13. Pressure-sensitive adhesive tape comprising backing material and a tacky adhesive coating composition thereon, said coating composition comprising a rubbery elastomer selected from the group consisting of natural rubber, styrene-butadiene rubber, polyisoprene, and mixtures thereof and 50 parts to 125 parts by weight per 100 parts by weight of said elastomer of a tackifier, said tackifier comprising a copolymer of a cyclic monoterpene hydrocarbon component and a comonomer selected from the group consisting of styrene, alkylstyrenes having fewer than 13 carbon atoms, alkenylstyrenes having fewer than 13 carbon atoms, and mixtures, thereof, said copolymer containing approximately 0.2 part of 20 parts by weight of said terpene component per part by weight of said comonomer.

14. Pressure-sensitive adhesive tape according to claim 13 wherein the tackifier is a dipentene-styrene copolymer.

15. Pressure-sensitive adhesive tape according to claim 13 wherein the tackifier is a copolymer obtained by polymerizing a mixture of monomers comprising (a) a mixture of terpenes containing approximately 40 to 60 percent of dipentene, 25 to 40 percent of allo-ocimene, and 15 to 25 percent of terpene oligomers and (b) divinylbenzene.

16. Pressure-sensitive adhesive tape according to claim 13 wherein the tackifier is a copolymer obtained by polymerizing a mixture of monomers comprising α-pinene and divinylbenzene.

17. Pressure-sensitive adhesive tape according to claim 13 wherein the elastomer comprises styrene-butadiene rubber.

References Cited
UNITED STATES PATENTS

| | | | |
|---|---|---|---|
| 2,349,210 | 5/1944 | Traylor | 260—86 |
| 2,368,767 | 2/1945 | Moore | 260—8 |
| 2,383,084 | 8/1945 | Rummelsburg | 260—86 |
| 2,383,399 | 8/1945 | Lindquist | 260—78 |
| 2,439,343 | 4/1948 | Kropa | 260—86 |
| 2,648,614 | 8/1953 | Martin et al. | 260—4 |
| 3,058,930 | 11/1962 | Samour | 260—4 |

MURRAY TILLMAN, *Primary Examiner.*

M. J. TULLY, *Assistant Examiner.*